United States Patent
Hsu et al.

(10) Patent No.: US 12,353,638 B1
(45) Date of Patent: Jul. 8, 2025

(54) SYSTEM FOR TOUCH INTERACTION WITH NON-TOUCHSCREEN DISPLAY

(71) Applicant: AMAZON TECHNOLOGIES, INC., Seattle, WA (US)

(72) Inventors: Morris Yuanhsiang Hsu, Mountain View, CA (US); Raghunandan M Rao, Santa Clara, CA (US); Amit Kachroo, San Jose, CA (US); Koushik Araseethota Manjunatha, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/475,775

(22) Filed: Sep. 27, 2023

Related U.S. Application Data

(60) Provisional application No. 63/501,518, filed on May 11, 2023.

(51) Int. Cl.
| | |
|---|---|
| *G06F 3/01* | (2006.01) |
| *G01S 13/42* | (2006.01) |
| *G01S 13/58* | (2006.01) |
| *G01S 13/87* | (2006.01) |
| *G01S 13/88* | (2006.01) |
| *G06F 17/14* | (2006.01) |

(52) U.S. Cl.
CPC .............. *G06F 3/017* (2013.01); *G01S 13/42* (2013.01); *G01S 13/583* (2013.01); *G01S 13/87* (2013.01); *G01S 13/88* (2013.01); *G06F 17/142* (2013.01)

(58) Field of Classification Search
CPC .......... G06F 3/017; G06F 7/142; G01S 13/42; G01S 13/583; G01S 13/87; G01S 13/88
See application file for complete search history.

(56) References Cited

U.S. PATENT DOCUMENTS

| | | | |
|---|---|---|---|
| 2012/0022348 A1* | 1/2012 | Droitcour | A61B 5/0816 600/407 |
| 2022/0231701 A1* | 7/2022 | Furtek | H03M 13/616 |
| 2022/0413120 A1* | 12/2022 | Va | G01S 7/2921 |

OTHER PUBLICATIONS

"BGT60TR13C 60 GHz Radar Sensor Datasheet v2.4.6" Infineon Technologies AG, Jan. 8, 2021, 45 pgs. Retrieved from the Internet: URL: https://www.infineon.com/dgdl/Infineon-BGT60TR13CDataSheet-DataSheet-v01_00-EN.pdf?fileId=8ac78c8c7d718a49017d94bac88e5d43.

(Continued)

*Primary Examiner* — Robert J Michaud
(74) *Attorney, Agent, or Firm* — Lindauer Law, PLLC

(57) ABSTRACT

A device comprises a display and a plurality of radars. For example, the radars may be arranged around a perimeter of the device, with their respective fields of view directed toward the display. Output from the radar is processed to generate input frames. The input frames are then processed to determine touch data indicative of a position with respect to the display. The input frames may be processed to determine the touch data using a trained machine learning module or a geometric estimation module. For example, the trained machine learning module may accept input frames comprising one or more of range fast-Fourier transform (FFT) data or doppler FFT data and provide as output the touch data.

20 Claims, 9 Drawing Sheets

(56) References Cited

OTHER PUBLICATIONS

"BGT60TR13C Shield, XENSIV 60 GHz Radar System Platform", Infineon Technologies AG, Feb. 14, 2023, 19 pgs. Retrieved from the Internet: URL: https://www.infineon.com/dgdl/Infineon-AN600_BGT60TR13C_Shield-ApplicationNotes-v02_40-EN.pdf?fileId=8ac78c8c7d0d8da4017d3318e31c2ad6.

"Digital Beamforming Using the BGT60TR13C Radar Sensor, Estimating Range and Angle", Infineon Technologies AG, Aug. 25, 2022, 9 pgs. Retrieved from the Internet: URL: https://www.infineon.com/dgdl/Infineon-AN652_Digital_Beamforming_using_the_BGT60TR13C_Radar_Sensor-ApplicationNotes-v01_30-EN.pdf?fileId=8ac78c8c8779172a0187e2848e2d0f73.

"Distance Estimation Using Xensiv KIT CSK BGT60TR13C", Infineon Technologies AG, Jun. 6, 2023, 22 pgs. Retrieved from the Internet: URL: https://www.infineon.com/dgdl/Infineon-AN667_Distance_estimation_using_XENSIV_KIT_CSK_BGT60TR13C-ApplicationNotes-v01_00-EN.pdf?fileId=8ac78c8c8900bb5701890257117a1aa4.

"Radar Baseboard MCU7, Xensiv 60 GHz radar system platform", Infineon, Feb. 14, 2023, 23 pgs. Retrieved from the Internet: URL: https://www.infineon.com/dgdl/Infineon-AN599_Radar_Baseboard_MCU7-ApplicationNotes-v02_70-EN.pdf?fileId=5546d4627550f45401755594a51a4d27.

Cerna et al., "The Fundamentals of FFT-Based Signal Analysis and Measurement", National Instruments Corporation, Jul. 2000, 20 pgs. retrieved from the Internet: URL: https://www.sjsu.edu/people/burford.furman/docs/me120/FFT_tutorial_NI.pdf.

Lovescu, et al., "The Fundamentals of Millimeter Wave Radar Sensors", Texas Instruments, 2021, 9 pgs. Retrieved from the Internet: URL: https://www.ti.com/lit/pdf/spyy005.

Tong, et al., "Fast Chirp FMCW Radar in Automotive Applications", 4 pgs. Retrieved from the Internet: URL: https://www.tu-chemnitz.de/physik/EXSE/ForPhySe/Tong%20Fast%20Chirp%20FMCW%2007455584.pdf.

\* cited by examiner

SYSTEM FOR TOUCH INTERACTION WITH NON-TOUCHSCREEN DISPLAY

PRIORITY

This application claims priority to, and the benefit of, U.S. Provisional Patent Application Ser. No. 63/501,518 filed on May 11, 2023, titled "SYSTEM FOR TOUCH INTERACTION WITH NON-TOUCHSCREEN DISPLAY", the contents of which are hereby incorporated by reference into the present disclosure.

BACKGROUND

The cost of conventional touch sensitive display technologies, such as capacitive touch sensors, grows substantially with larger displays. For example, the cost of a capacitive touchscreens scales quadratically with the size of the display.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
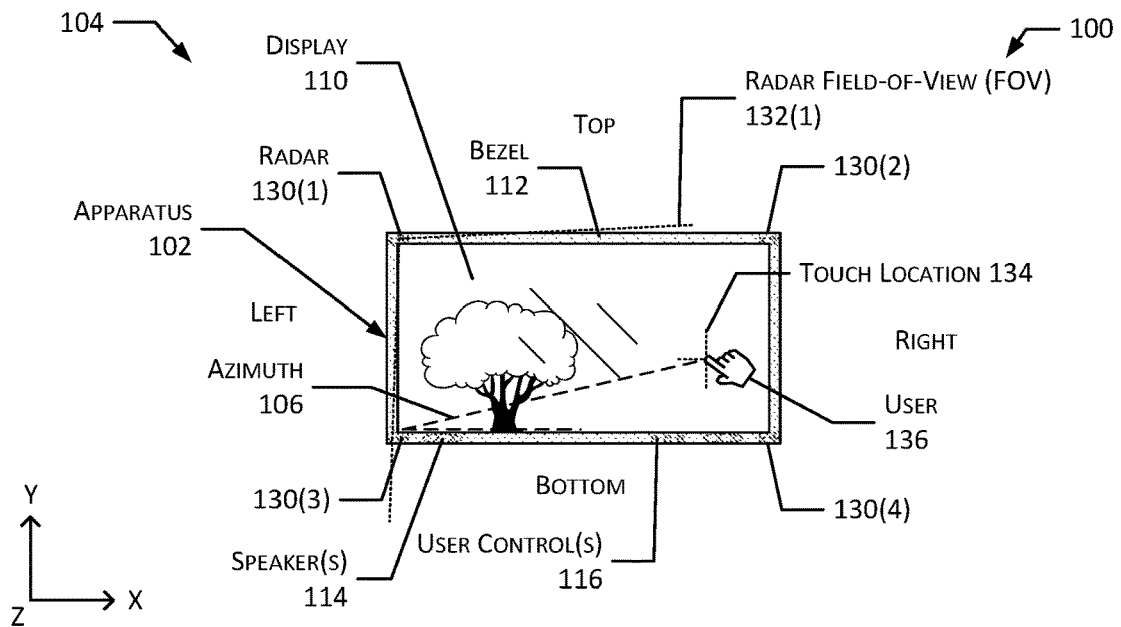
FIG. 1 illustrates an apparatus having a display and a plurality of radars to determine touch data, showing operation in two orientations according to some implementations.
Figure 1:
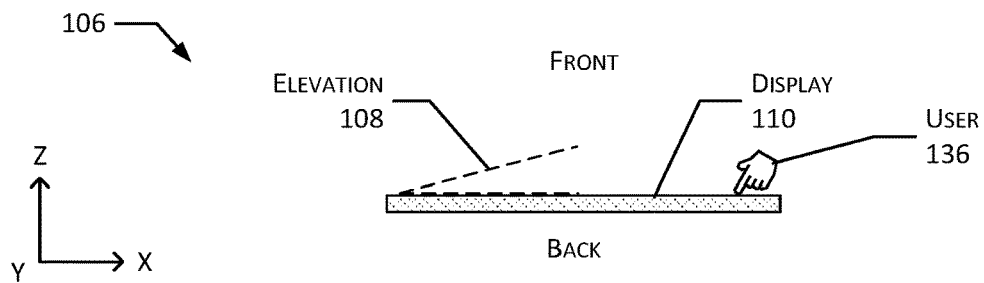
Figure 1:
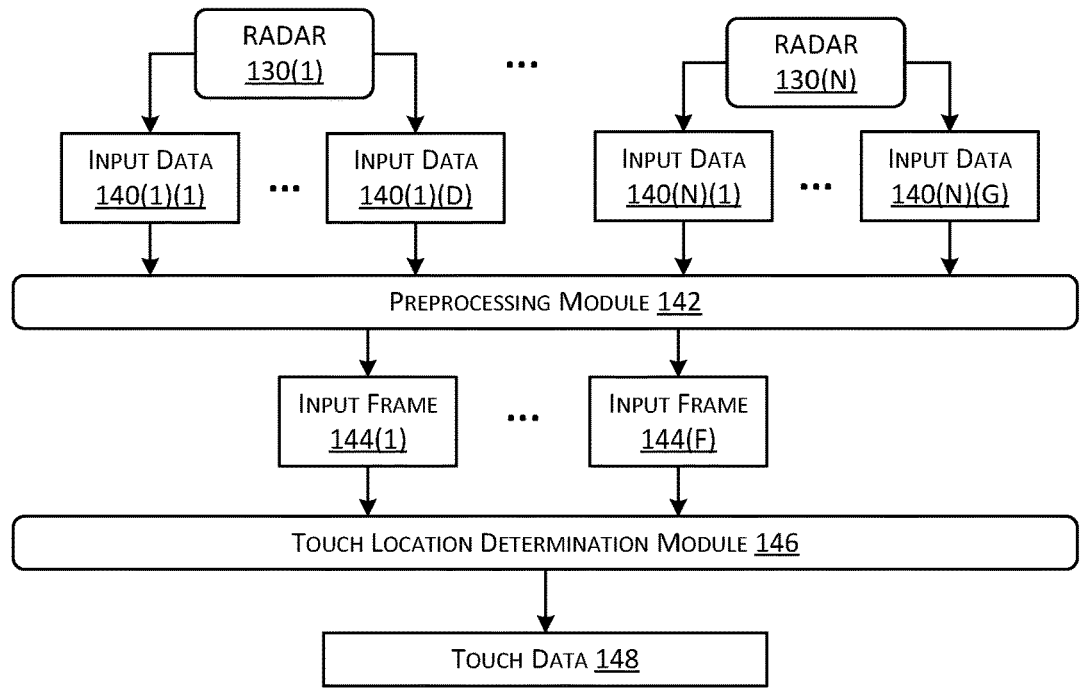

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A display device that includes a touch sensor provides a useful way to present information to a user and acquire input associated with that information being presented. Conventional touch sensitive display technologies, such as capacitive touch sensors, are costly, and become prohibitively expensive as the size of the display increases.

Described in this disclosure is an apparatus and techniques to use a plurality of radars to determine touch data associated with a display device. The apparatus comprises a display device and a plurality of radar sensors. The respective fields-of-view (FOV) of the radar sensors are directed toward the display. Output from each of the radar sensors, such as an intermediate frequency (IF) signal, is digitized and processed to generate an input frame. The input frames are then processed to determine touch data indicative of a position with respect to the display device. The touch data may be indicative of a position, with respect to the display device, of an object such as a user's hand.

In one implementation a trained machine learning (ML) module processes the input frames to determine the touch data. In another implementation, a geometric estimation module uses multilateration techniques to determine the touch data based on the distance to an object and previously stored data indicative of the placement of the radar sensors with respect to the display device.

By using the techniques described in this disclosure, touch data that is spatially accurate may be determined. For example, using the ML module, the touch data may be determined with a median error of 3 centimeters (cm) or less. This accuracy allows touch data to be used with user interfaces that are spatially dense, such as having many on-screen controls arranged relatively close to one another that are relatively small.

The apparatus and techniques may be used to provide touch input for displays having diagonal sizes ranging from less than a meter to those spanning many meters. The apparatus and techniques may utilize various display technologies, ranging from emissive displays such as light emitting diodes (LEDs) to projection-based displays. For example, a rear-projection display that is ten meters diagonally may utilize the radar sensors and techniques described in this disclosure to determine touch data.

The apparatus and techniques may also be used in a wide variety of environmental and operating conditions. For example, the apparatus may be mounted in a ruggedized weatherproof enclosure, and still provide the functionality of determining the touch data. In another example, the apparatus may determine touch data regardless of whether the user's hands are bare, or if they are wearing gloves.

By using the apparatus and techniques described in this disclosure, touch data indicative of a position of a user's hand may be accurately and cost effectively determined for large display devices. The apparatus may then be operated based at least in part on this touch data. For example, an application may use the touch data to determine user input, change presentation of data on the display device, and so forth.

Illustrative System

FIG. 1 illustrates at 100 an apparatus 102 having a display and a plurality of radars to determine touch data, showing operation in two orientations according to some implementations. The apparatus 102 is shown in a front view 104 and a side view 106.

The apparatus 102 comprises a display device ("display") 110. The display 110 may comprise one or more of a light emitting diode (LED) display, organic LED display, liquid crystal display, quantum dot display, front projection display, rear projection display, and so forth. The display 110 may be operated to present images.

A bezel 112 may surround a perimeter of the display 110. An exposed frontal area of the bezel 112 may have a constant width or may vary. For example, some portions of the bezel 112 may be wider than others.

The apparatus 102 may comprise a plurality of speakers 114. The speakers 114 may be located within the bezel 112, behind the bezel 112, and so forth. The speakers 114 may be concealed by the bezel 112, or may operate through the bezel 112 such as via one or more holes, channels, membranes, and so forth to transfer sound to the surrounding environment.

The apparatus 102 may comprise one or more user controls 116. These user controls 116 may comprise buttons, switches, capacitive touch sensors, and so forth. The user controls 116 may be used to perform operations such as turning the apparatus 102 on or off, providing input to a user interface of the apparatus 102, adjusting amplitude of the sound emitted by the speakers 114, and so forth. In this illustration, the user controls 116 are located within the bezel 112.

A plurality of radar sensors ("radars") 130 are located within the bezel 112 and proximate to the display 110, with their respective radar fields-of-view (FOV) 132 directed toward the display 110. Each respective radar FOV 132 encompasses a volume that is proximate to the display 110, such as the volume of space above the display 110. In the implementation depicted, one radar 130 is located at each of the four corners of the display 110, with their respective radar FOV 132 directed toward a center of a plane of the display 110. A first radar 130(1) is located at an upper left corner, a second radar 130(2) is located at an upper right corner, a third radar 130(3) is located at a lower left corner, and a fourth radar 130(4) is located at a lower right corner. As a result of this arrangement, the radar FOV 132(1)-(4) overlap. In other implementations other arrangements of radars 130 may be used. For example, the apparatus 102 may comprise two radars 130. In other implementations the radars 130 may be located at other positions with respect to the display 110.

During operation, a user 136 may point at or touch a portion of the display 110. For example, the user 136 may place their finger close to the display 110 and may or may not come into contact with the display 110. A touch location 134 specifies coordinates, with respect to the display 110, of that touch or close approach. Depending upon system configuration, a touch may require contact with the display device 110, or a touch may be designated as a close approach that remains within a threshold area for a specified minimum duration of time. For example, if the user 136 holds their finger close to the display 110 and maintains that finger within an area of 3 centimeters square for 100 milliseconds, a touch input may be deemed to have occurred.

The radar 130 may provide as output one or more signals that are indicative of one or more of a range, azimuth 106, elevation 108, doppler shift, and so forth. The range may be indicative of a distance between the radar 130 and a detected object. The azimuth 106 may indicate an angle within the display plane between a first reference direction and a line extending from the radar 130 to the detected object. The elevation 108 may indicate an angle in a plane that is perpendicular to the display plane between a second reference direction and a line extending from the radar 130 to the detected object.

During operation, a plurality of radars 130(1)-(N) provide input data 140. In some implementations the radar 130 may provide as output an analog signal comprising an intermediate frequency (IF) signal resulting from a product of the emitted radar frequency and a returned signal. The IF signal may then be digitized using an analog to digital converter (ADC) that samples the IF signal and provides as output a digitized representation, such as a stream of digital data. In some implementations the apparatus 102 may utilize oversampling to improve range resolution. For example, oversampling the digitized representation is determined by sampling the IF signal at a frequency that is N times twice a bandwidth of the IF signal, where N is an integer greater than 1. The input data 140 may comprise the digital representation of the IF signal, or samples. In some implementations each sample may be associated with a particular interval of time, such as a particular radar pulse or chirp.

Each radar 130 generates a respective set of input data 140. In this illustration, the first digit in parenthesis indicates the radar 130, while the second digit represents a number of the sample. For example, the first radar 130(1) generates input data 140(1)(1)-140(1)(D), where D is an integer number greater than 1. Continuing the example, radar 130(N) generates input data 140(N)(1)-140(N)(G), where N and G are integer numbers greater than 1.

In some implementations the input data 140 may include, or may be associated with, additional information. For example, signal-to-noise ratio (SNR) information may be associated with the input data 140.

A preprocessing module 142 accepts and processes the input data 140 to determine input frames 144. In one implementation the preprocessing module 142 may apply a fast Fourier transform (FFT) to a plurality of the input data 140. Operation of the preprocessing module 142 is discussed in more detail with regard to FIG. 4.

In one implementation where the input data 140 is indicative of range data, the resulting input frames 144 comprise range FFT data representing range bins, time, and signal amplitude of the returned signal. The range data is indicative of a distance from the radar sensor 130 to an object. The range bins comprise intervals of range values.

In another implementation where the input data 140 is indicative of doppler data, the resulting input frames 144 comprise doppler FFT data representing velocity bins, time, and amplitude of the returned signal. The doppler data is indicative of a radial velocity of an object relative to the radar sensor 130. The velocity bins comprise intervals of velocity values.

In some implementations the input frames 144 may include, or may be associated with, additional information. For example, signal-to-noise ratio (SNR) information may be associated with the input frames 144.

The input frames 144(1), 144(2), . . . , 144(F) are provided as input to a touch location determination module 146. The touch location determination module 146 determines as output the touch data 148. The touch data 148 is indicative of the touch location 134, with respect to the display 110. The touch data 148 may comprise time series 470-data, indicative of coordinates of touch locations 134 at respective times.

In one implementation the touch location determination module 146 may use a trained machine learning module to determine the touch data 148. This implementation is discussed in more detail with regard to FIGS. 4-6. In another implementation a geometric estimation module may be used to determine the touch data 148. This implementation is discussed in more detail with regard to FIGS. 7-9.

In some implementations information associated with the input frames 144 may be used to select which modules will be used. In one implementation, if the SNR associated with an input frame 144 is less than a threshold SNR value, the machine learning module may be used. If the SNR associated with the input frame 144 is greater than the threshold SNR value, the geometric estimation module may be used.

In another implementation, distance information may be used to select which module to use. For example, touch data 148 provided by the machine learning module when the user 136 is closer to a center of the display 110 may be more accurate than that provided by the geometric estimation module. If the distance associated with an input frame 144 is less than a threshold distance value, the geometric estimation module may be used. If the distance is greater than or equal to the threshold distance value, the machine learning module may be used.

The touch data 148 may be used to operate the apparatus 102 or other devices. For example, the touch data 148 may be used to determine a user selection of a control that is presented on the display 110.

Figure 2:
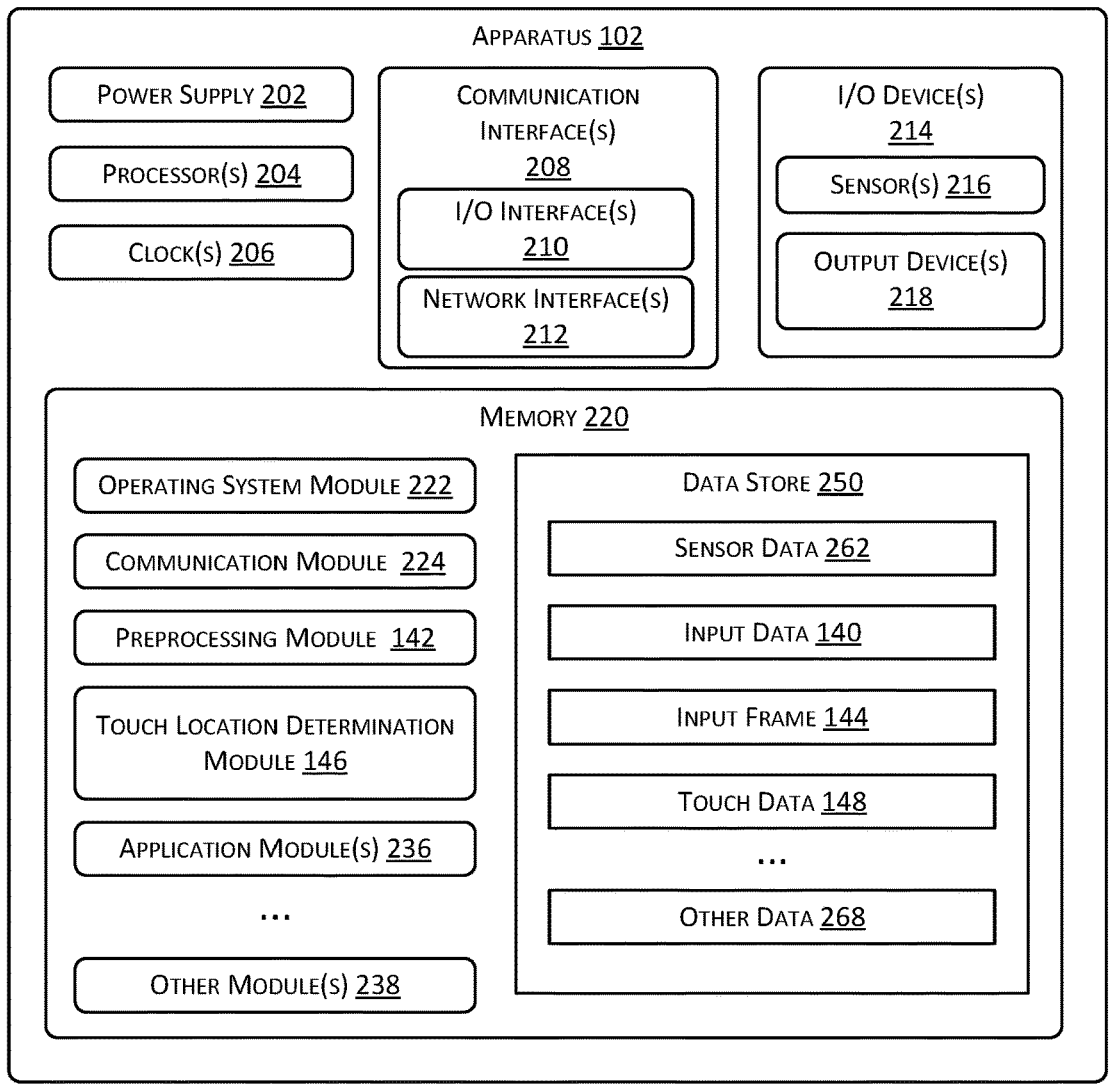
FIG. 2 is a block diagram of the apparatus, according to some implementations.

FIG. 2 is a block diagram 200 of the apparatus 102, according to some implementations.

The apparatus 102 comprises one or more computing devices and may include a power supply 202 to provide electrical power to operate the various components in the apparatus 102. For example, the power supply 202 may convert alternating current obtained from a utility line to one or more voltages.

The apparatus 102 may include one or more hardware processors 204 (processors) configured to execute one or more stored instructions. The processors 204 may comprise one or more cores. The processors 204 may include microcontrollers, systems on a chip, field programmable gate arrays, digital signal processors, graphic processing units, image signal processors, coprocessors, general processing units, and so forth.

One or more clocks 206 may provide information indicative of date, time, ticks, and so forth. For example, the processor 204 may use data from the clock 206 to associate a particular time with an action, sensor data 262, and so forth.

The apparatus 102 may include one or more communication interfaces 208 such as input/output (I/O) interfaces 210, network interfaces 212, and so forth. The communication interfaces 208 enable the apparatus 102, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more sensors 216. The I/O devices 214 may also include output devices 218. In some embodiments, the I/O devices 214 may be physically incorporated with the apparatus 102 or may be externally placed. The I/O devices 214 are discussed in more detail with regard to FIG. 3.

The network interfaces 212 may be configured to provide communications between the apparatus 102 and other devices such as other apparatuses 102, content servers, routers, access points, servers, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, Bluetooth Low Energy, ZigBee, and so forth. The apparatus 102 may also include one or more buses or other internal communications hardware or software that allow for the transfer of data between the various modules and components of the apparatus 102.

As shown in FIG. 2, the apparatus 102 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the apparatus 102. Example functional modules are shown stored in the memory 220, although the same functionality may alternatively be implemented in hardware, firmware, or as a system on a chip (SoC).

The data store 250 may store one or more of sensor data 262, such as acquired from one or more of the sensors 216. The data store 250 may also store one or more of the input data 140, the input frame(s) 144, or touch data 148.

The memory 220 may include at least one operating system (OS) module 222. The OS module 222 is configured to manage hardware resource devices such as the communication interfaces 208, the I/O devices 214, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 220 may be a data store 250 and one or more of the following modules. These modules may be executed as foreground applications, background tasks, daemons, and so forth. The data store 250 may use a flat file, database, linked list, tree, executable code, script, or other data structure to store information. In some implementations, the data store 250 or a portion of the data store 250 may be distributed across one or more other devices including other apparatuses 102, servers, network attached storage devices, and so forth.

A communication module 224 may be configured to establish communication with other devices, such as other apparatuses 102, an external server, and so forth. The communications may be authenticated, encrypted, and so forth.

The memory may include the preprocessing module 142.

The memory may include the touch location determination module 146.

In some implementations one or more of the preprocessing module 142 or the touch location determination module 146 may use sensor data 262 acquired from sensors 216 in addition to the RADAR sensors 130.

One or more application modules 236 may provide various functionality. For example, a content presentation module may provide for the presentation of content on the display device 110. In another example, a browser module may provide internet browser functionality using the apparatus 102.

The application module 236, OS module 222, or other modules 238 may utilize the touch data 148 during operation. For example, responsive to the touch data 148 the application module 236 may present content on the display 110 that is associated with the touch data 148.

The other modules 238 may provide other functionality, such as object recognition, speech synthesis, user identification, and so forth. The other modules 238 may comprise a speech synthesis module that is able to convert text data to human speech. For example, the speech synthesis module may be used by the apparatus 102 to provide speech that a user 136 is able to understand.

The data store 250 may store other data 268 as well. For example, localization settings may indicate local preferences such as language, user interface preferences, and so forth.

Figure 3:
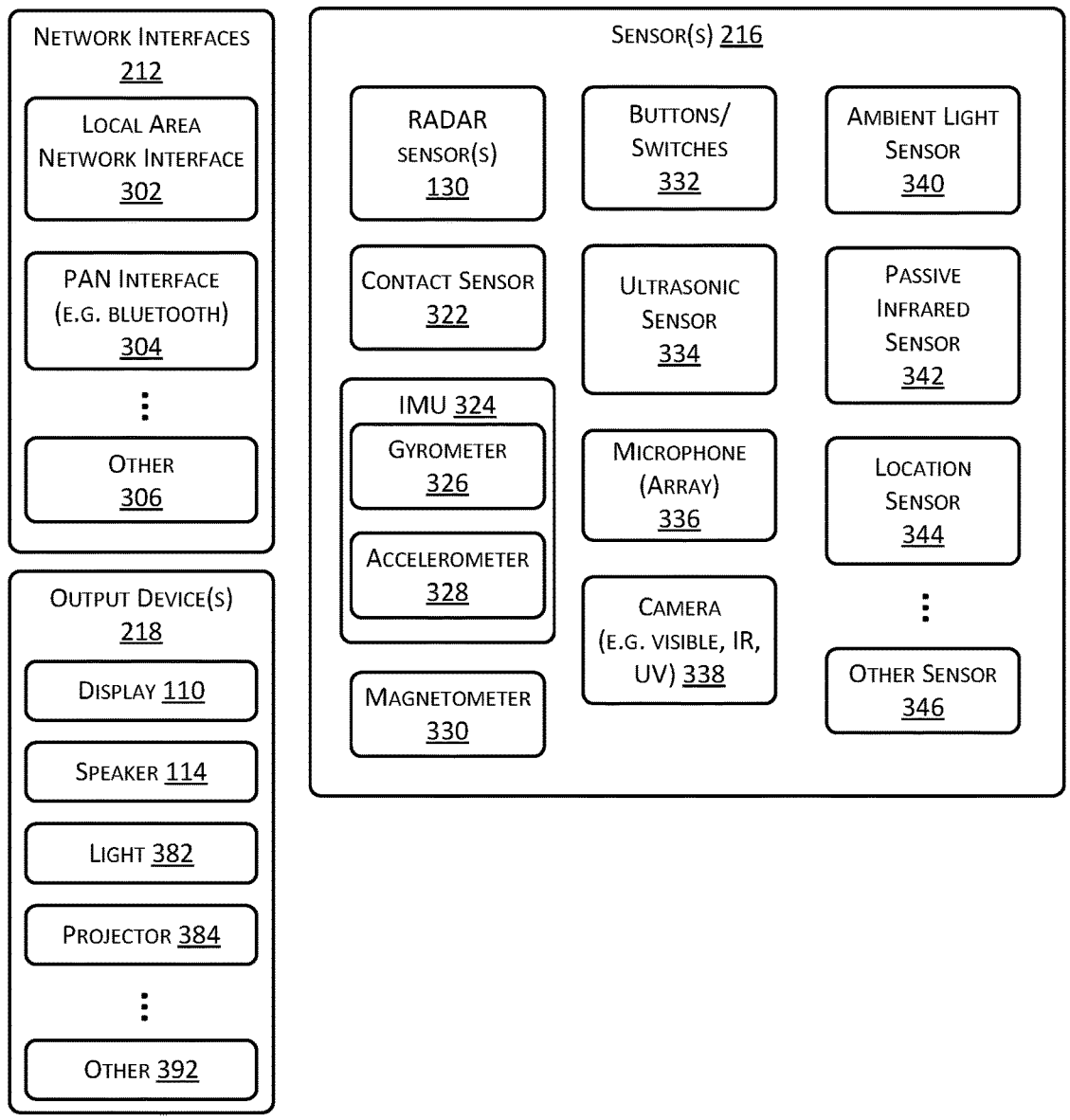
FIG. 3 is a block diagram of some components of the apparatus, according to some implementations.

FIG. 3 is a block diagram 300 of some components of the apparatus 102 such as network interfaces 212, sensors 216, and output devices 218, according to some implementations. The components illustrated here are provided by way of illustration and not necessarily as a limitation. For example, the apparatus 102 may utilize a subset of the particular network interfaces 212, output devices 218, or sensors 216 depicted here, or may utilize components not pictured.

The network interfaces 212 may include one or more of a local area network interface 302, PAN interface 304, or other 306 interfaces. The local area network interface 302 may be compliant with at least a portion of the Wi-Fi specification. For example, the local area network interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The other 306 network interfaces may include other equipment to send or receive data using other wavelengths or phenomena. For example, the other 306 network interface may include an ultrasonic transceiver used to send data as ultrasonic sounds, a visible light system that communicates by modulating a visible light source such as a light-emitting diode, and so forth. In another example, the other 306 network interface may comprise a wireless wide area network (WWAN) interface or a wireless cellular data network interface. Continuing the example, the other 306 network interface may be compliant with at least a portion of the LTE, 4G, 5G, or other standards.

The apparatus 102 may include one or more of the following sensors 216. The sensors 216 depicted here are provided by way of illustration and not necessarily as a limitation. It is understood that other sensors 216 may be included or utilized by the apparatus 102, while some sensors 216 may be omitted in some configurations.

A radar sensor 130 uses millimeter wavelength radio signals to acquire information about an object. The radar sensor 130 emits radio signals and detects the reflections of those radio signals. The radar sensor 130 may utilize a frequency modulated continuous wave (FMCW). In one implementation the radar sensor 130 may comprise the BGT60TR13C 60 GHz radar sensor from Infineon Technologies AG.

In one implementation, each of the plurality of radars 130 may operate with free-running local clocks controlling the timing of when a radar pulse or chirp is emitted. In another implementation, the plurality of radars 130 may be coordinated to a common clock to coordinate timing of when a radar pulse is emitted. For example, during coordinated operation each radar 130 is assigned a specified timeslot to transmit, during which other radars 130 do not transmit to prevent interference.

A contact sensor 322 provides data indicative of a contact between the display 110 and an object. The contact sensor 322 may comprise one or more of a strain gauge, inertial measurement unit (IMU) 324, inductive sensor, and so forth.

For example, a strain gauge may detect the force of a touch applied to the display 110 by a user 136. In another example, an accelerometer 328 may detect a vibration or acceleration of the apparatus 102 responsive to a touch applied to the display 110 by the user 136. In another example, an inductive sensor may determine a change in electrical inductance to one or more conductors associated with the display 110 to determine a touch applied to the display 110. In some implementations, the contact sensor 322 determines data indicative of contact with an object, and not information indicative of a position of the contact. In other implementations, other sensor 216 may be used as the contact sensor 322. For example, the microphone array 336 may detect the sound of the user 136 touching the display 110.

The inertial measurement unit (IMU) 324 may comprise a prepackaged solid state unit that comprises one or more gyrometers 326, accelerometers 328, and so forth. In other implementations, discrete components, such as a discrete accelerometer 328 may be used.

The gyrometer 326 may provide sensor data 262 indicative of rotation of an object affixed thereto. For example, a gyrometer 326 may generate sensor data 262 that is indicative of a change in orientation of the apparatus 102 or a portion thereof.

The accelerometer 328 provides sensor data 262 indicative of a direction and magnitude of an imposed acceleration. Data such as rate of change, or determination of changes in direction, speed, and so forth may be determined using the accelerometer 328. The accelerometer 328 may comprise mechanical, optical, micro-electromechanical, or other devices. For example, the gyrometer 326 in the accelerometer 328 may comprise a prepackaged solid-state IMU 324 that provides multiple axis gyrometers 326 and accelerometers 328.

A magnetometer 330 may be used to determine sensor data 262 indicative of an orientation by measuring ambient magnetic fields, such as the terrestrial magnetic field. For example, the magnetometer 330 may comprise a Hall effect transistor that provides output compass data indicative of a magnetic heading.

One or more buttons or switches 332 provide sensor data 262 indicative of manual input. The buttons or switches 332 may comprise mechanical switches, electronic switches, capacitive switches, and so forth.

An ultrasonic sensor 334 determines sensor data 262 using sounds in excess of 20 kHz to determine a distance from the sensor 216 to an object. The ultrasonic sensor 334 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 334 may provide information indicative of a presence of an object, distance to the object, and so forth. Two or more ultrasonic sensors 334 may be utilized in conjunction with one another to determine a location within a two-dimensional plane of the object.

A plurality of microphones 336 may be used to acquire sensor data 262 representative of sound present in the environment. The microphones 336 may be arranged into an array. These arrays may implement beamforming techniques to provide for directionality of gain. The apparatus 102 may use the one or more microphones 336 to acquire information from acoustic tags, accept voice input from users 136, determine a direction of an utterance, determine ambient noise levels, for voice communication with another user or system, to determine if the user 136 has touched the display 110, and so forth.

A camera 338 generates sensor data 262 indicative of one or more images. The camera 338 may be configured to detect light in one or more wavelengths including, but not limited to, terahertz, infrared, visible, ultraviolet, and so forth. For example, an infrared camera 338 may be sensitive to wavelengths between approximately 700 nanometers and 1 millimeter. The camera 338 may comprise charge coupled devices (CCD), complementary metal oxide semiconductor (CMOS) devices, microbolometers, and so forth. The apparatus 102 may use image data acquired by the camera 338 for object recognition, user communication, and so forth. The camera 338 may be used to acquire visible light, infrared, or other imagery.

An ambient light sensor 340 may comprise one or more photodetectors or other light-sensitive elements that are used to determine sensor data 262 indicative of one or more of the color, intensity, or duration of ambient lighting around the apparatus 102.

The sensors 216 may include a passive infrared (PIR) sensor 342. The PIR sensor 342 may determine sensor data 262 that is indicative of the presence of users, pets, and so forth. For example, the PIR sensor 342 may be configured to detect infrared radiation with wavelengths between 8 and 14 micrometers.

The apparatus 102 may include one or more location sensors 344. The location sensors 344 may comprise an optical, radio, or other navigational system such as a global positioning system (GPS) receiver. For indoor operation, the location sensors 344 may comprise indoor position systems, such as using Wi-Fi Positioning Systems (WPS). The location sensors 344 may provide information indicative of a relative location, such as "living room" or an absolute location such as particular coordinates indicative of latitude and longitude, or displacement with respect to a predefined origin.

The apparatus 102 may include other sensors 346 as well. For example, the other sensors 346 may include a radio frequency identification (RFID) reader, near field communication (NFC) system, and so forth.

The apparatus 102 includes one or more output devices 218. As mentioned earlier, the display 110 presents image data. The display 110 may comprise one or more of a liquid crystal display, LED display, electrophoretic display, cholesteric liquid crystal display, interferometric display, and so forth. The display 110 may be used to present visible information such as graphics, pictures, text, and so forth. The display 110 may also comprise a projector 384, such as with a front projection or rear projection system.

The speakers 114 emit sound.

The apparatus 102 may also include one or more lights 382. The lights 382 may be used to emit photons. The light 382 may comprise an LED, quantum dot device, and so forth.

In some implementations, the apparatus 102 may be equipped with a projector 384. The projector 384 may be able to project an image on a surface, such as the floor, wall, ceiling, projection screen, and so forth.

The apparatus 102 may also include other output devices 392.

Figure 4:
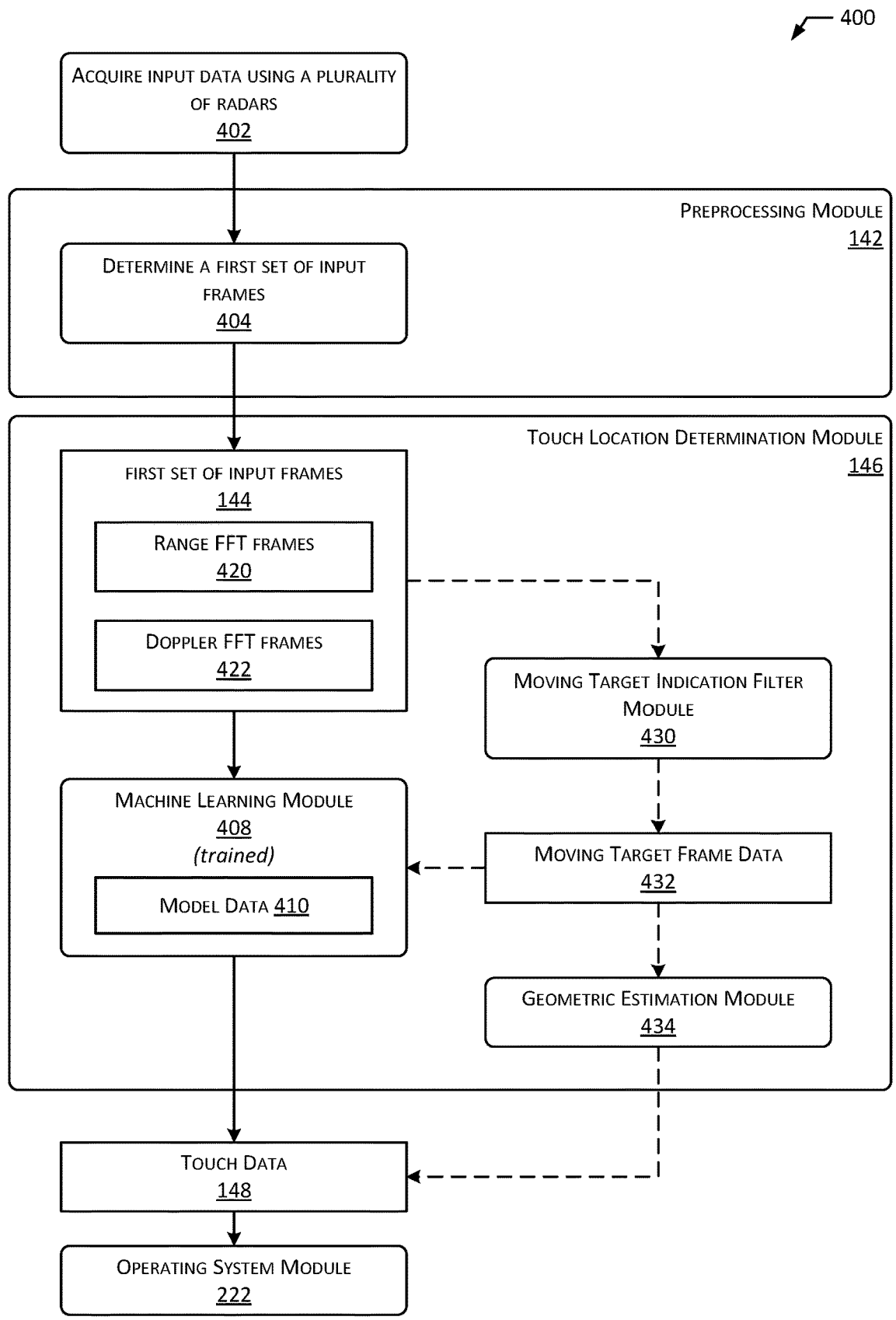
FIG. 4 illustrates a preprocessing module and a touch location determination module, according to some implementations.

FIG. 4 illustrates at 400 the preprocessing module 142 and the touch location determination module 146, according to some implementations.

As described above, the preprocessing module 142 accepts and processes the input data 140 to determine input frames 144.

In some implementations the radar sensors 130 or the preprocessing module 142 may perform windowing on the input data 140. For example, windowing may comprise processing the input data 140 such that a group of samples within a specified window or interval of time provide desired operating characteristics. For example, windowing may be used to ensure that an integral number of cycles are obtained to minimize spectral leakage during subsequent FFT operations.

In some implementations the radar sensors 130 or the preprocessing module 142 may perform zero padding on the input data 140. For example, zero padding may comprise adding zero values to fill or "pad" the input data 140. Zero padding may be used to produce a desired frame rate for subsequent use by the touch location determination module 146.

In some implementations one or more of the windowing or the zero padding may be performed on the analog IF signal or on the digitized representation of the IF signal provided by the ADC. In some implementations the ADC may include circuitry that performs one or more of the windowing or zero padding operations.

At 402, input data 140 is acquired using a plurality of radar sensors 130.

At 404, the input data 140 is processed by the preprocessing module 142 to determine a first set of input frames 144. The first set of input frames 144 may be expressed as a tuple [x, y, z] where "x" is a set of range or doppler FFT data, "y" is a number of frames, and "z" is a number of radars 130.

In one implementation, the preprocessing module 142 may apply a fast Fourier transform (FFT) to a plurality of the input data 140 indicative of range of data to determine range FFT frames 420. The data associated with the range FFT frames 420 may be designated as $x(n_f, n_c, n_r, i, j)$.

In another implementation, the preprocessing module 142 may apply a fast Fourier transform (FFT) to a plurality of the input data 140 indicative of doppler data to determine doppler FFT frames 422. The data associated with the doppler FFT frames 422 may be designated as $X(n_f, n_d, n_r, i, j)$.

In some implementations, the touch location determination module 146 may determine whether to use the machine learning module 408 or the geometric estimation module 434 to determine the touch data 148.

In one implementation, if the SNR associated with an input frame 144 is less than a threshold SNR value, the machine learning module 408 may be used. If the SNR associated with the input frame 144 is greater than or equal to the threshold SNR value, the geometric estimation module 434 may be used. This selection may be used to reduce the use of computational resources associated with determining the touch data 148. For example, the machine learning module 408 may require greater computational resources to execute than the geometric estimation module 434. Continuing the example, by selecting the geometric estimation module 434 the apparatus 102 may use fewer computational resources, consume less electrical power, and so forth, compared to the operation of the machine learning module 408. The threshold SNR value may be determined experimentally.

In another implementation, distance information may be used to select which module to use. If the distance associated with an input frame 144 is less than a threshold distance value, the geometric estimation module 434 may be used. If the distance is greater than or equal to the threshold distance value, the machine learning module 408 may be used. The distance threshold value may be determined experimentally.

In a first implementation, the first set of input frames 144 are provided as input to a machine learning (ML) module 408 that has been previously trained. The ML module 408 may comprise one or more of a deep learning network, convolutional neural network, classifier, multi-output regressor, and so forth. The results of training of the ML module 408 are embodied in model data 410 such as one or more weight values, bias values, and so forth. Training of the ML module 408 is discussed in more detail with regard to FIG. 5. One implementation of ML module 408 architecture is discussed in more detail with regard to FIG. 6. During operation, the ML module 408 processes the first set of input frames 144 and determines touch data 148.

The ML module 108 is able to operate with relatively low latency during inference while executing on the apparatus 102. For example, the ML module 108 may process the first set of input frames 144 and provide as output the touch data 148 of less than 100 milliseconds.

The touch data 148 may be provided to other modules. For example, the touch data 148 may be provided to the OS module 222, to one or more application modules 236, and so forth.

In a second implementation depicted with a broken line, the first set of input frames 144 may be processed by a moving target indication filter module 430 to determine moving target frame data 432. The moving target indication filter module 430 associated with the range FFT frames 420 may be designated as $x_{MTI}(n_f, n_c, n_r, i, j)$. The moving target indication filter module 430 associated with the doppler FFT frames 422 may be designated as $X_{MTI}(n_f, n_d, n_r, i, j)$.

The moving target indication filter module 430 may operate to pass frames that contain a moving object. The moving target indication filter module 430 may be used to filter or remove frames that are representative of stationary objects, such as objects in the room, parts of the apparatus 102 itself, and so forth. The moving target frame data 432 comprises a subset of the first set of input frames 144 that contain an object that is not stationary.

In a variation of the first implementation, the moving target frame data 432 may be provided as input to the machine learning module 408 instead of the first set of input frames 144. For example, range FFT frames 420 may be processed by the moving target indication filter module 430 and the resulting moving target frame data 432 may be provided to the machine learning module 408. In comparison, doppler FFT frames 422 may be provided to the machine learning module 408.

Figure 7:
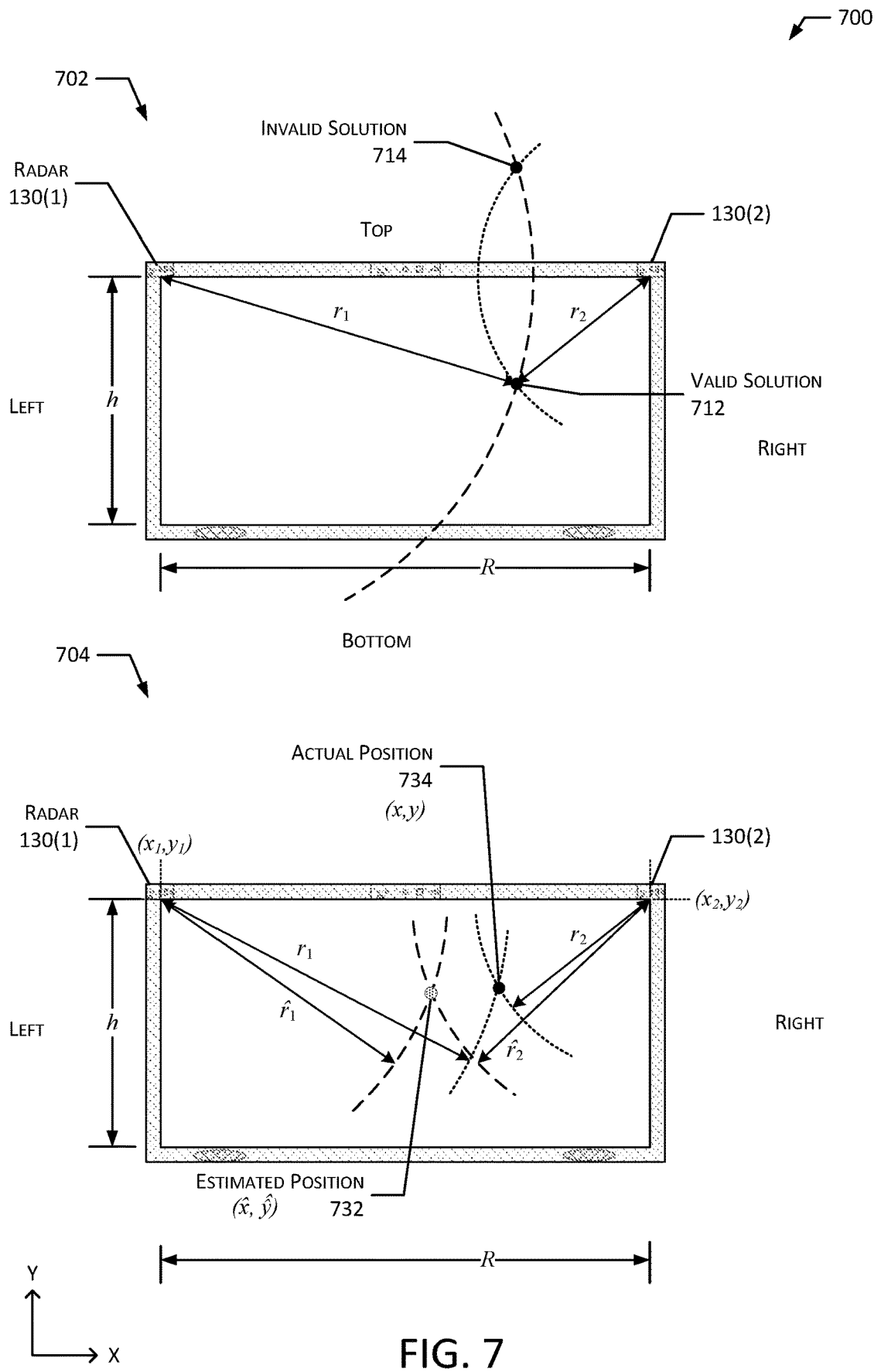
FIGS. 7-8 illustrate geometric aspects of determining touch data, according to some implementations.
Figure 8:
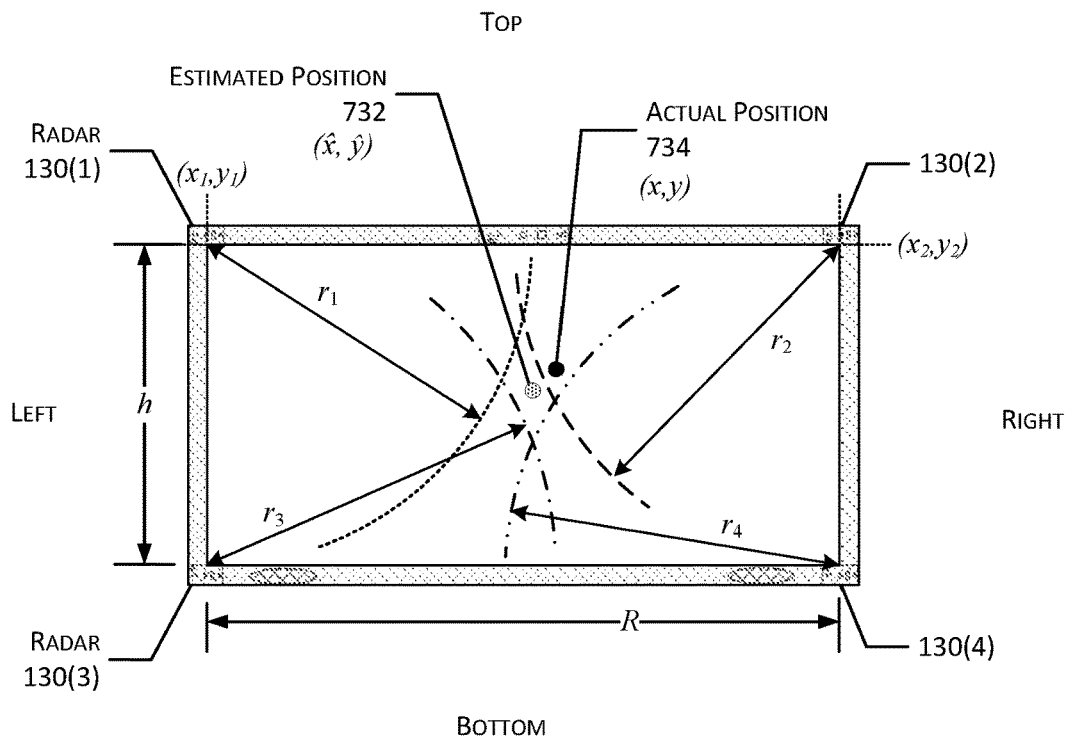

A geometric estimation module 434 processes the moving target frame data 432 to determine the touch data 148. For example, the geometric estimation module 434 may use multilateration to determine the touch location 134. FIGS. 7 and 8 illustrate various aspects of the multilateration used by the geometric estimation module 434. The geometric estimation module 434 is discussed in more detail with regard to FIG. 9.

In some implementations various combinations of the ML module 408 and geometric estimation module 434 may be used. In a first hybrid approach, the ML module 408 is trained to accept the first set of input frames 144 and output from the geometric estimation module 434 to determine the touch data 148. In a second hybrid approach, first output from the ML module 408 and second output from the geometric estimation module 434 may be fused to determine the touch data 148.

Figure 5:
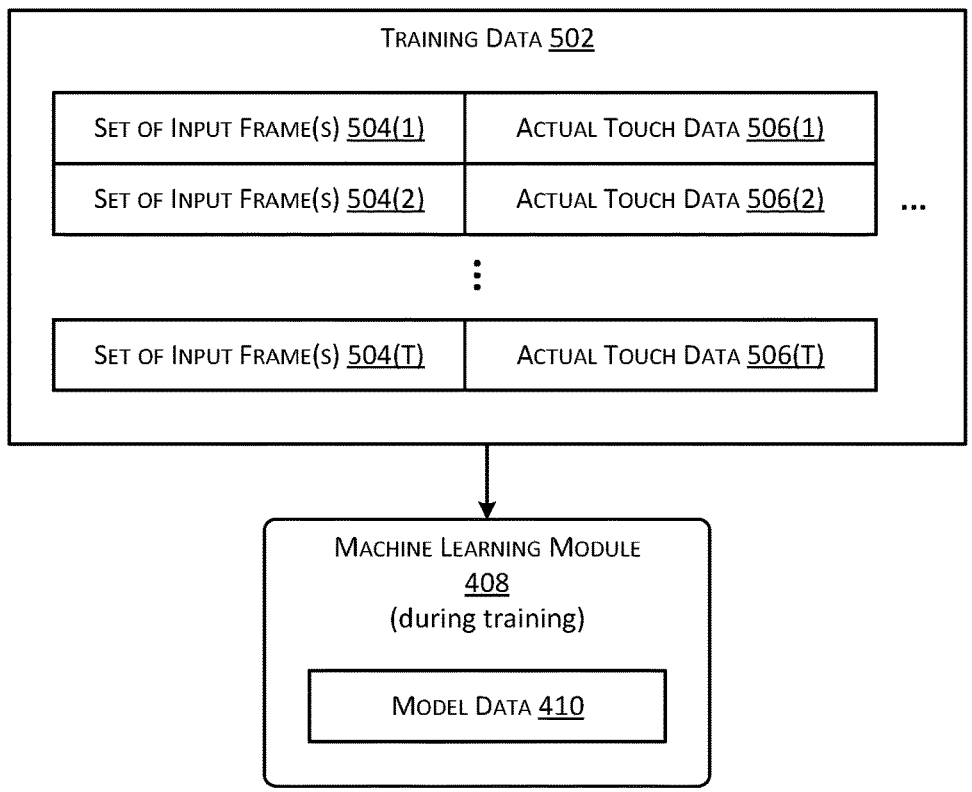
FIG. 5 illustrates training data for training a machine learning module, according to some implementations.

FIG. 5 illustrates at 500 training data 502 for training a machine learning module 408, according to some implementations. The training data 502 may comprise sets of input frames 504 and associated actual touch data 506. For example, the set of input frames 504 may comprise one or more of range FFT frames 420, doppler FFT frames 422, or moving target frame data 432. In one implementation, the actual touch data 506 may be acquired using a variation of the apparatus 102 that includes a touch sensor, such as a capacitive touch sensor, a force sensitive resistor touch sensor, and so forth. The set of input frames 504 may be associated with the actual touch data 506 based on time. For example, the set of input frames 504 may comprise the input frames 144 acquired during a specified time interval, such as 400 milliseconds, that ends at or after the time of the actual touch data 506.

The training data 502 may comprise one or more of actual data acquired from a physical implementation of the apparatus 102 as described above, or synthetic data that simulates operation of the apparatus 102.

During training, the machine learning module 408 may be provided with the training data 502. During iterations of training, the machine learning module 408 processes different sets of input frames 504 and determines corresponding touch data 148. A loss function may be used to determine a variance between the actual touch data 506 associated with one set of input frames 504 and the touch data 148. Output from the loss function may be used to change one or more values of the model data 410. In other implementations, other machine learning techniques may be used to train the machine learning module 408.

Figure 6:
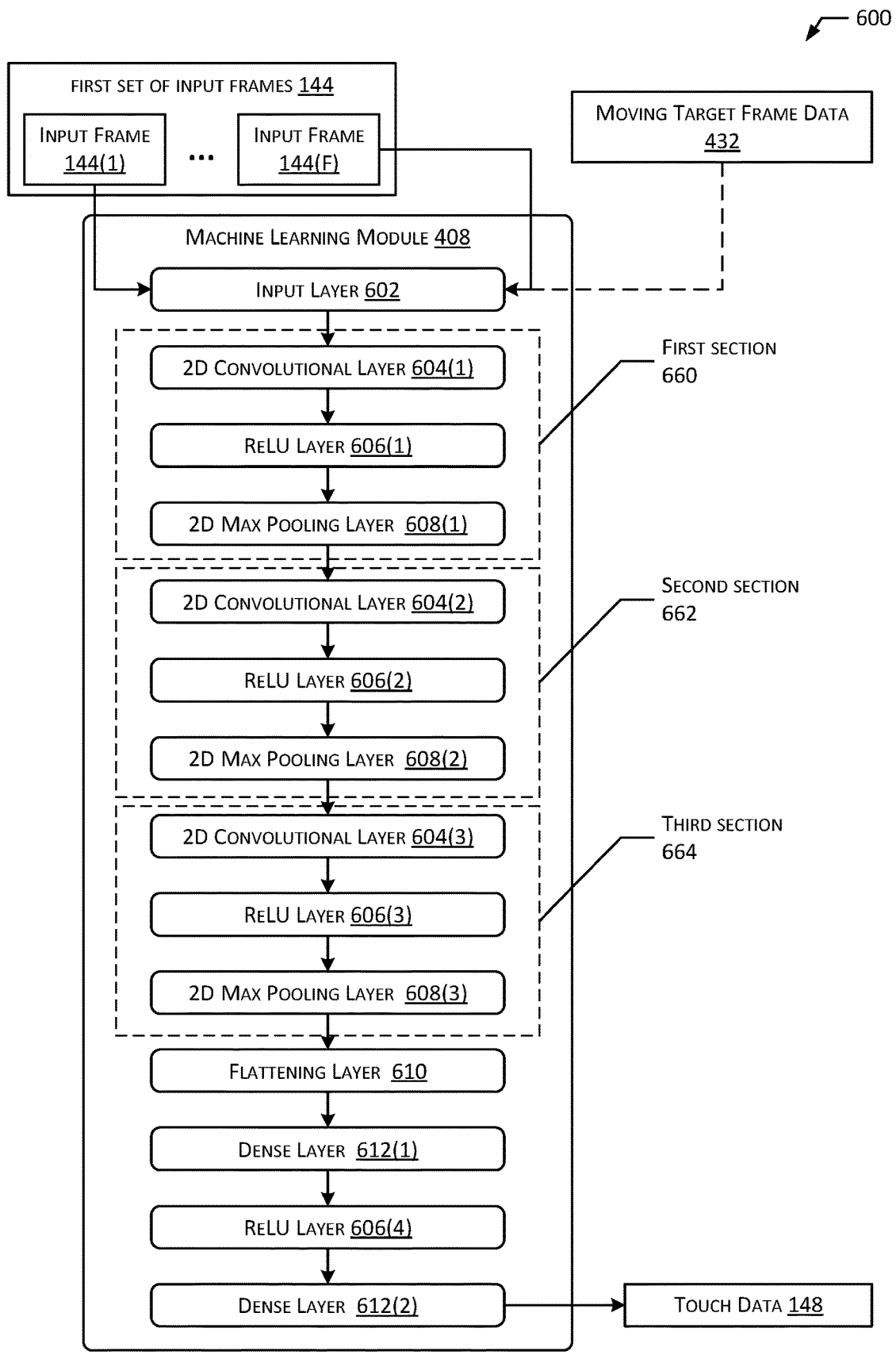
FIG. 6 illustrates various layers of a machine learning module, according to some implementations.

FIG. 6 illustrates at 600 various layers of the machine learning module 408, according to some implementations. The machine learning module 408 may comprise a neural network architecture that utilizes deep learning techniques. The architecture may comprise a plurality of layers, with each layer performing one or more operations. Output from each layer is subsequently processed by a subsequent or next layer.

An input layer 602 accepts as input one or more of the first set of input frames 144 or moving target frame data 432.

A first section 660 may comprise layers 604(1), 606(1), and 608(1).

A first two-dimensional (2D) convolutional layer 604(1) accepts as input the input layer 602. The 2D convolutional layer 604 uses a kernel and a convolution operation to extract features from an input. In one implementation the first 2D convolutional layer 604(1) may utilize a convolution kernel comprising a matrix of (3×3×4×32) and a bias of 32.

A first rectified linear unit (ReLU) layer 606(1) accepts as input the results from the first 2D convolutional layer 604(1). The first ReLU layer 606(1) uses a rectified linear unit activation function.

A first 2D maximum pooling layer 608(1) accepts as input the results from the first ReLU layer 606(1). The 2D maximum pooling layer 608(1) implements a non-linear downsampling to reduce dimensionality of the input. For example, the 2D maximum pooling layer 608 may comprise a layer with filters of size 2×2, applied with a stride of 2, which subsamples depth slices in the input by 2 along both width and height.

A second section 662 may comprise layers 604(2), 606(2), and 608(2).

A second 2D convolutional layer 604(2) accepts as input the output from the first 2D maximum pooling layer 608(1). In one implementation the second 2D convolutional layer 604(2) may utilize a convolution kernel comprising a matrix of (3×3×32×32) and a bias of 32.

A second ReLU layer 606(2) accepts as input the results from the second 2D convolutional layer 604(2).

A second 2D maximum pooling layer 608(2) accepts as input the results from the second ReLU layer 606(2).

A third section 664 may comprise layers 604(3), 606(3), and 608(3).

A third 2D convolutional layer 604(3) accepts as input the output from the second 2D maximum pooling layer 608(2). In one implementation the third 2D convolutional layer 604(3) may utilize a convolution kernel comprising a matrix of (3×3×32×32) and a bias of 32.

A third ReLU layer 606(3) accepts as input the results from the third 2D convolutional layer 604(3).

A third 2D maximum pooling layer 608(3) accepts as input the results from the third ReLU layer 606(3).

A flattening layer 610 accepts as input the results from the third 2D maximum pooling layer 608(3). The flattening layer 610 flattens the dimensionality of the input, and produces a vector output.

A first dense layer 612(1) accepts as input the results from the flattening layer 610. The dense layer 612 comprises a fully-connected layer. For example, a fully-connected layer may comprise each neuron connecting to every neuron in the previous layer.

A fourth ReLU layer 606(4) accepts as input the results from the first dense layer 612(1).

A second dense layer 612(2) accepts as input the results from the fourth ReLU layer 606(4). The touch data 148 comprises output from the second dense layer 612(2).

FIGS. 7-8 illustrate geometric aspects of determining touch data 148, according to some implementations. In the following figures, the radars 130(1)-(2) are assumed to not provide information about azimuth 106. If information about azimuth 106 is available, such as from beamforming or other techniques, such information may be used.

FIG. 7 illustrates at 700 a first view 702 and a second view 704 of the apparatus 102. For ease of illustration and not necessarily as a limitation, FIG. 7 depicts multilateration using two radars 130(1) and 130(2), also known as bilateration.

In the first view 702, a simplified illustration of bilateration is shown. A first distance $r_1$ indicates the distance between an object and the first radar 130(1). A second distance $r_2$ indicates the distance between the object and the second radar 130(2).

The object detected may be located at one or more intersections of the arcs described by $r_1$ and $r_2$. For example, assuming circular arcs, two intersections are possible. One of these intersections is outside of the area associated with the display 110. As a result, this may be deemed an invalid solution 714 and may be disregarded. The remaining intersection that is within the area associated with the display 110 may be deemed a valid solution 712. The valid solution 712 may correspond to the touch location 134 of the user 136, subject to errors in the distances $r_1$ and $r_2$.

Also depicted is a height of the display 110 labeled "h" and a width of the display 110 labeled "R".

The second view 704 depicts a situation using data obtained from the first radar 130(1) and the second radar 130(2), which may exhibit some noise. As above, the first distance $r_1$ indicates the distance between an object and the first radar 130(1), and the second distance $r_2$ indicates the distance between the object and the second radar 130(2). An actual position 734 is shown at the intersection between $r_1$ and $r_2$ that has been deemed valid, that is, within the area of the display 110.

Shown at 704 is a third distance $rhat_1$ that indicates the distance determined by the first radar 130(1) to the object and a fourth distance $rhat_2$ that indicates the distance determined by the second radar 130(2) to the object. An estimated position 732 is shown at the intersection between $rhat_1$ and $rhat_2$ that has been deemed valid, that is, within the area of the display 110.

Due to the errors associated with operation of the radars 130, the estimated position 732 may differ from the actual position 734. In some implementations, this difference may be reduced by adding additional radars 130, oversampling, performing additional signal processing, and so forth.

FIG. 8 depicts at 800 the apparatus 102 implementing multilateration using four radars 130(1)-(4). In this figure, the first distance $r_1$ indicates the distance determined by the first radar 130(1) to the object, and the second distance $r_2$ indicates the distance determined by the second radar 130(2) to the object. Similarly, the third distance $r_3$ indicates the distance determined by the third radar 130(3) to the object and the fourth distance $r_4$ indicates the distance determined by the fourth radar 130(4) to the object. The estimated position 732 may be determined based on this plurality of distances. For example, the estimated position 732 may be calculated as a geometric center of the area bordered by the plurality of distances.

As mentioned above, due to the errors associated with operation of the radars 130, the estimated position 732 may differ from the actual position 734.

In one implementation, the following equations may be used to perform multilateration. With regard to the following equations, the following variables are specified:

The chirp index is given by $n_c$, where $n_c = 0, 1, \ldots, N_c - 1$, and $N_c$ is the total number of chirps.

The frame index is given by $n_f$, where $n_f \in N^+$.

The sample index in the IF signal is denoted by $n_s$, wherein $n_s = 0, 1, \ldots, N_s - 1$, and $N_s$ is the total number of chirps.

The range bin in the range-FFT/doppler-FFT is denoted by $n_r$, where $n_r = 0, 1, \ldots, N_{os,r}N_s - 1$, with $N_{os,r}$ being the range-oversampling factor.

The doppler bin in the doppler-fft is denoted by $n_d$, wherein $n_d = 0, 1, \ldots, N_{os,d}N_c - 1$, with $N_{os,d}$ being the doppler-oversampling factor.

The receive antenna index for each radar 130 is denoted by i, where $i = 0, 1, \ldots, N_{rx} - 1$, with $N_{rx}$ being the total number of receivers in each radar 130.

The radar sensor index is denoted by j, where $j = 0, 1, \ldots, N_{sen} - 1$, with $N_{sen}$ being the total number of radar sensors 130 in the system.

The radar sensor 130 may comprise a plurality of antennas that radiate and collect electromagnetic signals. Antennas may be placed in various locations with a radar FOV 132 directing the gain of the antenna(s) in a particular direction. In some implementations, the radar sensor 130 and the antennas may be integrated into single device. In other implementations, the radar sensor 130 and the antennas may be separated, such as via a feedline. The following describes two implementations: bilateration and multilateration. In other implementations other positions and configurations may be used.

If $N_{sen} = 2$, the radar sensors 130 are placed at the corners of the display 110, as shown in FIG. 1.

If $N_{sen}>2$, the radar sensors 130 may be placed in an arbitrary manner on the edge of the display 110 and desired touch input area.

For ease of illustration and not as a limitation, assume that an origin is at radar 130(1), the x-axis is along the width of the display 110, and the negative y-axis is along the height of the display 110.

In one implementation, the following operations may be performed by one or more of each radar sensor 130 or the preprocessing module 142.

Windowing and zero-padding is applied to the IF signal to obtain the processed signal $x_z$.

The range-fft x is computed by taking an FFT on $x_z$ across fast time.

The doppler-fft X is computed by taking an FFT on x across each chirp in the frame.

The contributions from static objects are removed using MTI-filtering, to get the corresponding range-fft $x_{MTI}$ and doppler-fft $X_{MTI}$ respectively. For example, the moving target indication filter module 430 may be used to generate moving target frame data 432.

In some implementations, receive-beamforming may be performed on $x_{MTI}$ and $X_{MTI}$ to get $x_{bf}$ and $X_{bf}$ respectively. From the post-MTI quantities $x_{MTI}$ and $X_{MTI}$, the per-receiver range estimate $\hat{r}_{j,i}$ is computed for the $i^{th}$ RX antenna of the $j^{th}$ radar sensor 130.

A consistency check may be performed for the per-receiver range estimates to check whether the maximum and minimum range estimate in the vector; lie within the threshold distance $r_{con,th}$. If the consistency check passes, then the post-beamformed quantities $x_{bf}$ and $X_{bf}$ are used to estimate the final range estimate from sensor j. Else, the final range estimate from sensor j is taken to be not-a-number (nan).

Once the range estimates $r_j$ are obtained for all radar sensors j=0, 1, . . . , $N_{sen}-1$, the target's position at the $n_f^{th}$ frame $(\hat{x}_t(n_f), \hat{y}_t(n_f))$ is estimated in the following manner.

If $N_{sen}=2$, Equation 1 may be used to determine the position. For this equation, radar sensor 130(0) is placed at the origin (0,0), and the radar sensor 130(1) is placed on the x-axis at (0, $R_{sep}$).

$$(\hat{x}_t(n_f), \hat{y}_t(n_f)) = \left(\frac{1}{2}R_{sep} + \frac{r_0^2(n_f) - r_1^2(n_f)}{2R_{sep}}, \right.$$

$$\left. \frac{-R_{sep}}{2}\sqrt{\frac{2(r_0^2(n_f) + r_1^2(n_f))}{R_{sep}^2} - \frac{(r_0^2(n_f) - r_1^2(n_f))^2}{R_{sep}^4} - 1}\right)$$

(Equation 1)

If $N_{sen}>2$, Equation 2 may be used to determine the position, assuming that the $j^{th}$ radar sensor is placed at $(x_j, y_j)$.

$$(\hat{x}_t(n_f), \hat{y}_t(n_f)) = \operatorname*{argmin}_{(x,y) \in \mathbb{R}^2} \sum_{j=1}^{N_{sen}} \left(\hat{r}_j(n_f) - \sqrt{(x_j-x)^2 + (y_j-y)^2}\right)^2$$

(Equation 2)

Figure 9:
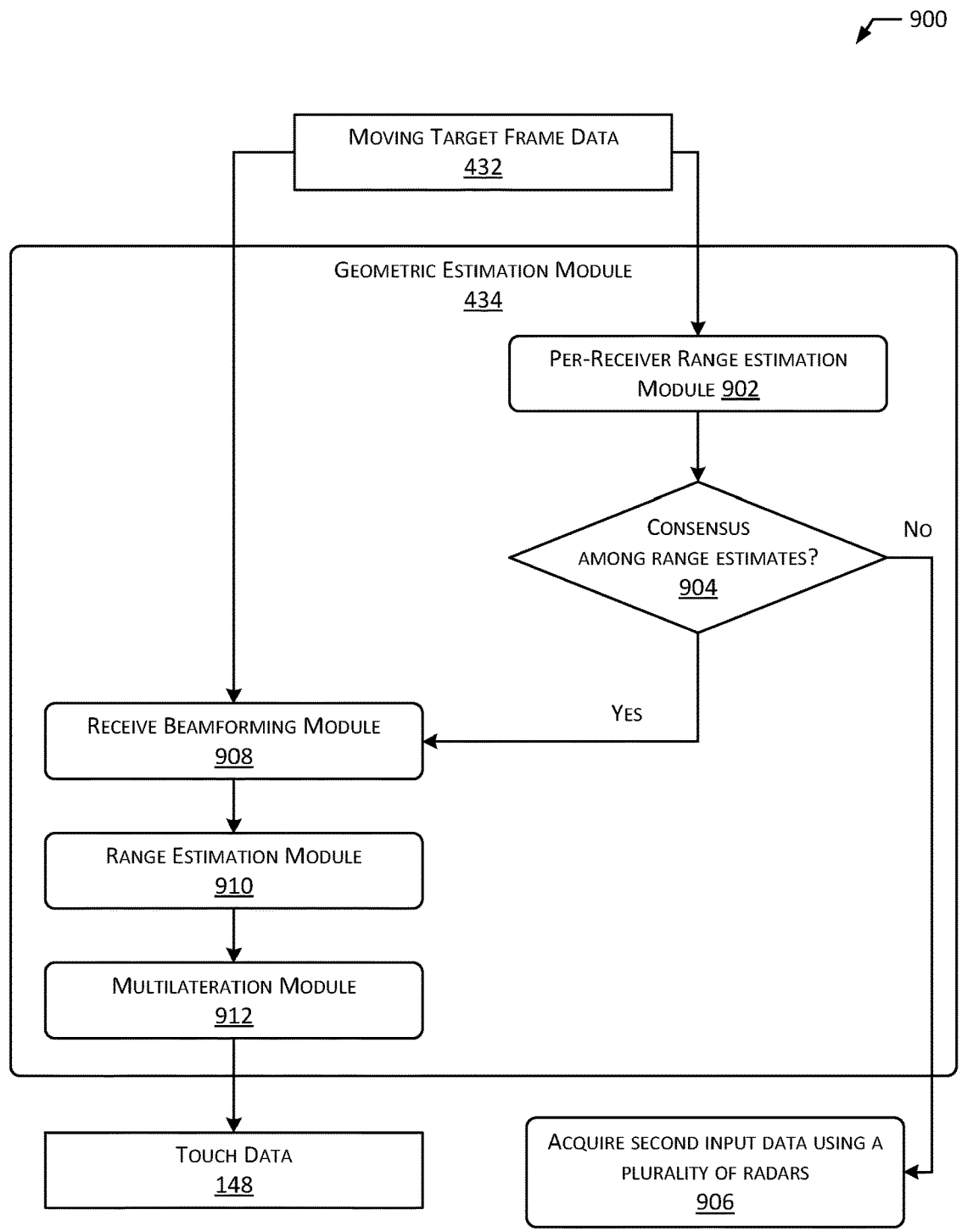
FIG. 9 illustrates a geometric estimation module, according to some implementations.

FIG. 9 illustrates at 900 the geometric estimation module 434, according to some implementations.

The geometric estimation module 434 may include a per-receiver range estimation module 902. The per-receiver range estimation module 902 accepts moving target frame data 432 as input and determines a set of range estimation values that are associated with individual receivers of a radar sensor 130. The set of range estimation values may be designated as $\hat{r}_j(n_f)=[\hat{r}_{j,1}(n_f), \hat{r}_{j,2}(n_f), \ldots, \hat{r}_{j,N_{r_x}}(n_f)]$.

At 904 a determination is made as to whether there is a consensus among the set of range estimation values. If no, the process proceeds to 906. If yes, the process proceeds to 908.

At 906 the previous data is disregarded, and second input data is acquired using the plurality of radars 130. For example, the process may proceed to process a next frame of moving target frame data 432.

A receive beamforming module 908 accepts as input the moving target frame data 432 and determines as output the $x_{bf}$ and $X_{bf}$ values. The receive beamforming module 908 may also use the consensus of range estimates from 904. For example, the receive beamforming module 908 may use one or more beamforming algorithms to determine the output.

A range estimation module 910 accepts as input the output from the range beamforming module 908, such as $x_{bf}$ and $X_{bf}$ values and determines the range estimates $\hat{r}_j(n_f)$.

A multilateration module 912 accepts as input the range estimates $\hat{r}_j(n_f)$ and determines as output the touch data 148. For example, the multilateration module 912 may implement one or more of the Equation 1 in implementations using two radars 130 or Equation 2 in implementations using more than two radars 130.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   a display device;
   a plurality of radar sensors located at one or more corners of the display device, wherein a field-of-view (FOV) of each radar sensor includes a volume proximate to the display device; and
   one or more processors that execute instructions to:
      acquire input data using the plurality of radar sensors, wherein the input data is a digitized representation of intermediate frequency (IF) signals from respective ones of the plurality of radar sensors;
      determine a first set of input frames based on the input data, wherein each input frame of the first set of input frames is associated with a respective one of the plurality of radar sensors;
      determine, based on the first set of input frames, touch data indicative of a location with respect to the display device; and
      operate the apparatus based at least in part on the touch data.

2. The apparatus of claim 1, the one or more processors to further execute the instructions to:
   acquire, using one of the plurality of radar sensors, a first set of input data over a first interval of time, wherein the first interval of time corresponds to a chirp;
   process the first set of input data using a first fast Fourier transform (FFT) algorithm to determine a first set of range FFT data, wherein the first set of range FFT data is part of range FFT data that is indicative of signal amplitude within respective ones of a first set of range bins;
   determine, based on the first set of range FFT data, average range FFT data; and
   determine, based on a first plurality of the average range FFT data, a first input frame of the first set of input frames.

3. The apparatus of claim 1, the one or more processors to further execute the instructions to:
   determine, based on the first set of input frames and a moving target indication filter, a second set of input frames, wherein the second set of input frames are associated with detection of an object that is moving; and
   determine the touch data by processing the second set of input frames using a trained machine learning module.

4. The apparatus of claim 1, wherein the first set of input frames comprises one or more of:
   range data indicative of signal amplitude within respective ones of a first set of range bins, or
   doppler data indicative of a frequency change within respective ones of a second set of range bins.

5. The apparatus of claim 1, wherein the digitized representation is determined by sampling the IF signal at a frequency that is N times twice a bandwidth of the IF signal, where N is an integer greater than 1.

6. The apparatus of claim 1, the one or more processors to further execute the instructions to:
   determine, based on the first set of input frames and a moving target indication filter, a second set of input frames, wherein the second set of input frames are associated with detection of an object that is moving;
   determine a first subset of frames from the second set of input frames, wherein the first subset of frames are associated with a first radar sensor of the plurality of radar sensors;
   determine a second subset of frames from the second set of input frames, wherein the second subset of frames are associated with a second radar sensor of the plurality of radar sensors;
   determine, based on the first subset of frames, a first range value indicative of a distance from the first radar sensor to the object;
   determine, based on the second subset of frames, a second range value indicative of a distance from the second radar sensor to the object;
   determine, based on the first range value and the second range value, a first position that is located within an area associated with the display device; and
   wherein the touch data comprises the first position.

7. The apparatus of claim 1, the one or more processors to further execute the instructions to:
   determine a signal-to-noise ratio (SNR) value that is associated with the first set of input frames;
   if the SNR value is less than a threshold SNR value, process the first set of input frames using a machine learning module to determine the touch data; and
   if the SNR value is greater than or equal to the threshold SNR value, process the first set of input frames using a geometric estimation module to determine the touch data.

8. The apparatus of claim 1, the one or more processors to further execute the instructions to:
   determine a distance value that is associated with the first set of input frames;
   if the distance value is less than a threshold distance value, process the first set of input frames using a geometric estimation module to determine the touch data; and
   if the distance value is greater than or equal to the threshold distance value, process the first set of input frames using a machine learning module to determine the touch data.

9. A method comprising:
   acquiring input data using a plurality of radar sensors of an apparatus, wherein the plurality of radar sensors are located within a display device of the apparatus, and wherein a field-of-view (FOV) of each radar sensor includes a volume proximate to the display device;
   determining a first set of input frames based on the input data, wherein each input frame of the first set of input frames is associated with a respective one of the plurality of radar sensors;

determining, based on the first set of input frames, touch data indicative of a location with respect to the display device; and operating the apparatus based at least in part on the touch data.

10. The method of claim 9, further comprising:
acquiring, using one of the plurality of radar sensors, a first set of input data over a first interval of time, wherein the first interval of time corresponds to a chirp;
processing the first set of input data using a first fast Fourier transform (FFT) algorithm to determine a first set of range FFT data, wherein the first set of range FFT data is part of range FFT data that is indicative of signal amplitude within respective ones of a first set of range bins;
determining, based on the first set of range FFT data, average range FFT data; and
determining, based on a first plurality of the average range FFT data, a first input frame of the first set of input frames.

11. The method of claim 9, further comprising:
determining, based on the first set of input frames and a moving target indication filter, a second set of input frames, wherein the second set of input frames are associated with detection of an object that is moving; and
determining the touch data by processing the second set of input frames using a trained machine learning module.

12. The method of claim 9, wherein the first set of input frames comprises one or more of:
range data indicative of signal amplitude within respective ones of a first set of range bins, or
doppler data indicative of a frequency change within respective ones of a second set of range bins.

13. The method of claim 9, further comprising:
determining, based on the first set of input frames and a moving target indication filter, a second set of input frames, wherein the second set of input frames are associated with detection of an object that is moving;
determining a first subset of frames from the second set of input frames, wherein the first subset of frames are associated with a first radar sensor of the plurality of radar sensors;
determining a second subset of frames from the second set of input frames, wherein the second subset of frames are associated with a second radar sensor of the plurality of radar sensors;
determining, based on the first subset of frames, a first range value indicative of a distance from the first radar sensor to the object;
determining, based on the second subset of frames, a second range value indicative of a distance from the second radar sensor to the object;
determining, based on the first range value and the second range value, a first position that is located within an area associated with the display device; and
wherein the touch data comprises the first position.

14. The method of claim 9, further comprising:
determining a signal-to-noise ratio (SNR) value that is associated with the first set of input frames;
if the SNR value is less than a threshold SNR value, processing the first set of input frames using a machine learning module to determine the touch data; and
if the SNR value is greater than or equal to the threshold SNR value, processing the first set of input frames using a geometric estimation module to determine the touch data.

15. The method of claim 9, further comprising:
determining a distance value that is associated with the first set of input frames;
if the distance value is less than a threshold distance value, processing the first set of input frames using a geometric estimation module to determine the touch data; and
if the distance value is greater than or equal to the threshold distance value, processing the first set of input frames using a machine learning module to determine the touch data.

16. An apparatus comprising:
a display device;
a plurality of radar sensors located within the display device, wherein a field-of-view (FOV) of each radar sensor includes a volume proximate to the display device; and
one or more processors that execute instructions to:
acquire input data using the plurality of radar sensors;
determine a first set of input frames based on the input data, wherein each input frame of the first set of input frames is associated with a respective one of the plurality of radar sensors; and
determine, based on the first set of input frames and using a machine learning module, touch data indicative of a location with respect to the display device.

17. The apparatus of claim 16, the one or more processors to further execute the instructions to:
acquire, using one of the plurality of radar sensors, a first set of input data over a first interval of time, wherein the first interval of time corresponds to a chirp;
process the first set of input data using a first fast Fourier transform (FFT) algorithm to determine a first set of range FFT data, wherein the first set of range FFT data is part of range FFT data that is indicative of signal amplitude within respective ones of a first set of range bins;
determine, based on the first set of range FFT data, average range FFT data; and
determine, based on a first plurality of the average range FFT data, a first input frame of the first set of input frames.

18. The apparatus of claim 16, the one or more processors to further execute the instructions to:
determine, based on the first set of input frames and a moving target indication filter, a second set of input frames, wherein the second set of input frames are associated with detection of an object that is moving; and
determine the touch data by processing the second set of input frames using a trained machine learning module.

19. The apparatus of claim 16, wherein the first set of input frames comprises one or more of:
range data indicative of signal amplitude within respective ones of a first set of range bins, or
doppler data indicative of a frequency change within respective ones of a second set of range bins.

20. The apparatus of claim 16, wherein the input data is a digitized representation of intermediate frequency (IF) signals from respective ones of the plurality of radar sensors, and further wherein the digitized representation is determined by sampling the IF signal at a frequency that is N times twice a bandwidth of the IF signal, where N is an integer greater than 1.

* * * * *